(12) United States Patent
Horst et al.

(10) Patent No.: US 11,009,585 B2
(45) Date of Patent: May 18, 2021

(54) MICROWAVE AND MILLIMETER WAVE IMAGING

(71) Applicant: The Curators of the University of Missouri, Columbia, MO (US)

(72) Inventors: Matthew J. Horst, Rolla, MO (US); Reza Zoughi, Wildwood, MO (US); Mohammad Tayeb Ghasr, Rolla, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 169 days.

(21) Appl. No.: 16/171,146

(22) Filed: Oct. 25, 2018

(65) Prior Publication Data
US 2019/0128999 A1 May 2, 2019

Related U.S. Application Data

(60) Provisional application No. 62/577,793, filed on Oct. 27, 2017.

(51) Int. Cl.
*G01S 7/03* (2006.01)
*G01S 13/90* (2006.01)
(Continued)

(52) U.S. Cl.
CPC ............. *G01S 7/032* (2013.01); *G01S 13/90* (2013.01); *G01S 13/9011* (2013.01); *H01Q 3/24* (2013.01);
(Continued)

(58) Field of Classification Search
CPC ................................. G01S 7/032; G01S 13/90
(Continued)

(56) References Cited

U.S. PATENT DOCUMENTS 3,796,948 A   3/1974  Wentworth
4,364,008 A * 12/1982  Jacques .................. G01R 27/04
                                                 324/636
(Continued)

FOREIGN PATENT DOCUMENTS

WO      2018/115372 A1    6/2018

OTHER PUBLICATIONS

Sheen, David M. et al., Three-Dimensional Millimeter-Wave Imaging for Concealed Weapon Detection, IEEE Transactions on Microwave Theory and Techniques, vol. 49, No. 9, Sep. 2001, pp. 1581-1592.

*Primary Examiner* — Marcus E Windrich
(74) *Attorney, Agent, or Firm* — Stinson LLP

(57) ABSTRACT

Microwave and millimeter wave imaging. An antenna array in communication with a signal source comprises a plurality of antennas by which a signal generated by the signal source is transmitted incident to an object located remotely from the antenna array and by which a signal reflected from the object is received by the antenna array. The signals transmitted by the antennas collectively have an effective electric field resembling a plane-wave within a target region in front of the antenna array. A plurality of detectors each connected to one of the antennas is configured to simultaneously receive the reflected signal and provide an output signal representative thereof. An image processor configured to execute an imaging algorithm generates a multi-dimensional profile representative of the object based on the output signals from the detectors.

16 Claims, 11 Drawing Sheets

(51) Int. Cl.
  *H01Q 21/08* (2006.01)
  *H01Q 3/24* (2006.01)
  *H01Q 3/28* (2006.01)
  *H01Q 21/06* (2006.01)
  *H01Q 13/08* (2006.01)
  *H01Q 3/36* (2006.01)

(52) U.S. Cl.
  CPC .............. *H01Q 3/28* (2013.01); *H01Q 3/36* (2013.01); *H01Q 13/085* (2013.01); *H01Q 21/064* (2013.01); *H01Q 21/08* (2013.01)

(58) Field of Classification Search
  USPC ........................................................ 342/22
  See application file for complete search history.

(56) References Cited

U.S. PATENT DOCUMENTS

| | | | |
|---|---|---|---|
| 5,760,397 A | 6/1998 | Huguenin et al. | |
| 6,005,397 A | 12/1999 | Zoughi et al. | |
| 6,320,553 B1 * | 11/2001 | Ergene | H01Q 19/192 343/761 |
| 7,190,177 B2 | 3/2007 | Zoughi et al. | |
| 7,439,749 B2 | 10/2008 | Zoughi et al. | |
| 7,746,266 B2 | 6/2010 | Zoughi et al. | |
| 7,852,256 B2 * | 12/2010 | Zemany | H01Q 1/1221 342/22 |
| 8,144,052 B2 * | 3/2012 | Cooper | G01S 13/87 342/179 |
| 8,212,573 B2 | 7/2012 | AbouKhousa et al. | |
| 8,362,942 B2 * | 1/2013 | McNeill | G01S 7/4004 342/22 |
| 8,482,602 B2 | 7/2013 | Pommerenke et al. | |
| 9,046,605 B2 | 6/2015 | Ghasr et al. | |
| 9,081,045 B2 | 7/2015 | Zoughi et al. | |
| 9,316,734 B2 | 4/2016 | Case et al. | |
| 9,482,626 B2 | 11/2016 | Ghasr et al. | |
| 2008/0100510 A1 * | 5/2008 | Bonthron | H01Q 21/061 342/373 |
| 2009/0156118 A1 * | 6/2009 | Schadler | H01Q 21/24 455/25 |
| 2010/0328142 A1 | 12/2010 | Zoughi et al. | |
| 2011/0248796 A1 * | 10/2011 | Pozgay | G01S 13/4463 333/137 |
| 2011/0254727 A1 * | 10/2011 | Kam | G01S 13/89 342/179 |
| 2013/0082858 A1 * | 4/2013 | Chambers | G06N 99/00 342/22 |
| 2014/0125516 A1 * | 5/2014 | Ghasr | G01S 13/90 342/25 A |
| 2019/0346545 A1 * | 11/2019 | Sleasman | G01S 7/023 |

* cited by examiner

MICROWAVE AND MILLIMETER WAVE IMAGING

STATEMENT REGARDING FEDERALLY SPONSORED RESEARCH OR DEVELOPMENT

This invention was made with government support under grant NSF 1011744 awarded by the National Science Foundation—Graduate Research Fellow Program. The government has certain rights in the invention.

BACKGROUND

Microwave and millimeter wave imaging utilizing synthetic aperture radar (SAR) is capable of generating high resolution, 3D images of complex dielectric structures for many critical nondestructive testing, biomedical, and security applications. Recently, microwave imaging systems have been developed to make this technology portable with real-time image results, making them suitable for field inspection. Current microwave imaging systems use a transmitter, receiver, microwave multiplexer network(s), and an array of antennas. Electric field measurements on the aperture of the imaging system are made by routing signals between the transmitter, receiver, and a single antenna element one at a time. This results in a rapid electronic raster scan of the array aperture. The conventional ω-k SAR algorithm is then used to generate an image. Another imaging method known as MIMO-SAR (multiple input multiple output-SAR) follows a similar approach. Multiple transmitting antennas illuminate a target, and a separate array of antennas sequentially or simultaneously receive the electric field measurements. Often the transmitting antennas are sequentially switched with microwave multiplexer switches.

There are a few disadvantages to using microwave multiplexer switches. For instance, they are often expensive, constituting a significant portion of the overall material cost. Also, they incur signal loss between transmitter, receiver, and antenna array, which reduces system dynamic range and hence the quality of images produced. And their operation is frequency limited. These disadvantages become even more significant and further restrictive for very high frequencies in the millimeter wave regime.

SUMMARY

Aspects of the invention relate to an improved microwave and millimeter wave imaging system that does not require microwave multiplexer switches. This constitutes a marked developmental and technical advance over the existing imaging systems employing SAR. Aspects of the invention further relate to the development of an antenna array model without switches and a modification to the ω-k algorithm to properly generate images using the imaging system.

In an aspect, an imaging system includes an antenna array in communication with a signal source. The array comprises a plurality of antennas by which a signal generated by the signal source is transmitted incident to an object located remotely from the antenna array and by which a signal reflected from the object is received by the antenna array. The signals transmitted by the antennas collectively have an effective electric field resembling a plane-wave within a target region in front of the antenna array. A plurality of detectors each connected to one of the antennas is configured to simultaneously receive the reflected signal and provide an output signal representative thereof. An image processor configured to execute an imaging algorithm generates a multi-dimensional profile representative of the object based on the output signals from the detectors.

A method embodying aspects of the invention includes transmitting a signal from a source via an antenna array and incident to the object. The signal source is configured to provide an electromagnetic energy source ranging in frequencies up to and including a terahertz frequency range and the antenna array has a plurality of antennas by which the signal from the signal source is transmitted incident to the object within a target region located in front of the antenna array and by which a signal reflected from the object is received by the antenna array. The signals transmitted by the antennas collectively have an effective electric field resembling a plane-wave within the target region. The method also includes simultaneously receiving, by a plurality of detectors each connected to one of the antennas, the signal reflected from the object and providing an output signal representative thereof and generating, by a processor executing an imaging algorithm, a multi-dimensional profile representative of the object based on the output signals from the detectors.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
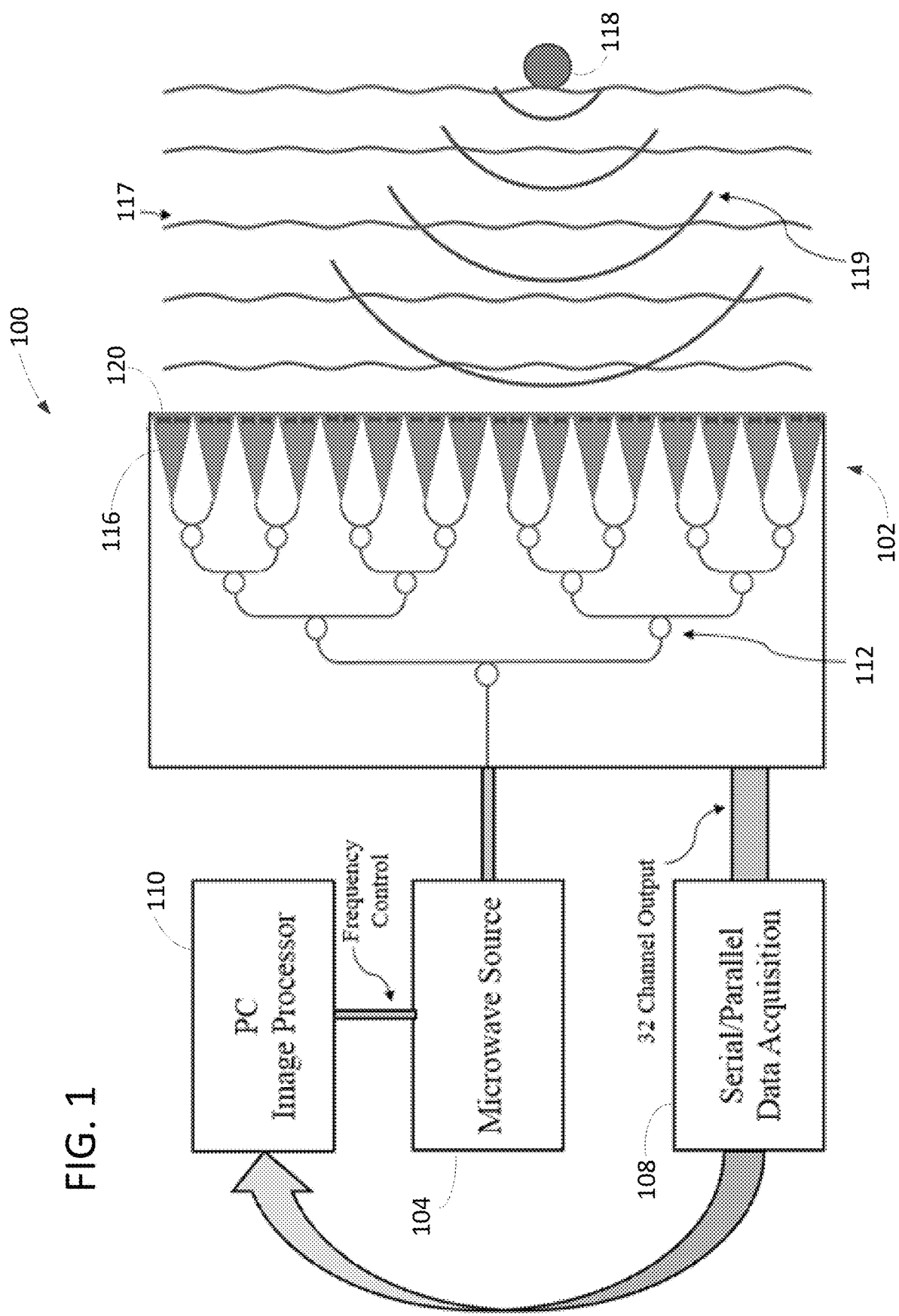
FIG. 1 is a schematic diagram of an imaging system in accordance with an embodiment of the invention.

Referring now to FIG. 1, an imaging system 100 embodying aspects of the present invention requires no active microwave multiplexer networks thus eliminating a major portion of the hardware and producing a system that is smaller and costs less. The system 100 of FIG. 1 comprises an antenna array 102 (e.g., a 16 element linear antenna array in the illustrated embodiment). In addition, system 100 comprises a microwave source 104, data acquisition hardware 108, and a processor 110 (e.g., a personal computer) for image processing. The microwave source 104, which has an output frequency programmed by the image processor 110, outputs a signal that is equally split by a passive divider network 112 (e.g., Wilkinson dividers) and distributed to each antenna 116 of the array 102. The system 100 in accordance with the illustrated embodiment produces signals that are emitted from the antennas 116 with substantially equal magnitude and phase. With uniform signal distribution for all antennas 116, an effective electric field 117 radiated from array 102 resembles a plane-wave within a target region located in front of antenna array 102. This pseudo plane-wave impinges on a target 118, and an electric field 119 reflected by the target 118 radiates back to array 102.

According to an embodiment, multiple detectors 120 at an aperture of imaging system 100 (e.g., 32 Schottky diodes in FIG. 1), mix the outgoing transmitted electric field 117 with the incoming reflected electric field 119. The output of the detectors 120 is a low frequency signal that is recorded by the data acquisition hardware 108. The recorded signals are then sent to image processor 110 running a modified version of the ω-k SAR algorithm to produce an image of target 118 in real-time.

The detectors 120 mix the received signal 119 with the outgoing signal 117 down to frequencies much lower than the microwave range (KHz-MHz range) and the data acquisition hardware 108 multiplexes the down-mixed signal from the detectors to a central analog to digital converter using low-cost, low frequency switches. For any antenna 116 in array 102, the signal transmitted by antenna 116 and the signal received by detectors 120 placed on the same antenna 116 are approximately at the same position, which allows for the implementation of the ω-k SAR algorithm for image processing. This is a major difference when compared to an imaging system using MIMO-SAR design concepts, where the transmitters and receivers cannot be approximated to the same location.

In an embodiment, image processor 110 executes a modified algorithm based on the the ω-k SAR algorithm with the equation shown below to generate images from the system 100 of FIG. 1. While the following derivation is applied for the 1D imaging system, the derivation applies for 2D imaging as well. The ω-k algorithm for a 1D imaging system where each antenna 116 is performing measurements one at a time, is described as:

$$I(x,z) = \int_{k_x}\left(\int_x s(x,f)e^{-jk_xx}dx\right)e^{j\left(\sqrt{4k^2-k_x^2}\right)z}e^{jk_xx}dk_x \quad (1)$$

In this equation, x represents a spatial location along the aperture of array 102, z represents distance from array 102, and f represents the frequencies emitted from array 102. Additionally, $k_x$ represents the wave number along the x direction. The raw measurement data recorded by imaging system 100 is shown as s(x, f), and the rendered image is I(x, z). Part of the equation, $K_z=\sqrt{4k^2-k_x^2}$, which is the wave number along the z direction, describes how the electric field radiated from one antenna 116 propagates to the target, and is scattered back and received by the same antenna 116. An important aspect of this wave number is that it describes both paths traveled by the electric field (array 102 to target 118 and target 118 back to array 102).

In the system 100 of FIG. 1, array 102 radiates a pseudo plane-wave and detectors 120 (e.g., Schottky diodes) simultaneously measure the backscattered signals. The wave number that represents the propagated electric field differs for the path from array 102 to target 118 and the path from target 118 back to array 102, so one simple wave number equation cannot describe both paths. Therefore the algorithm is generalized to become:

$$I(x,z)=\int_{k_x}(\int_x(s(x,f)e^{-jk_xx}dx)e^{j(k_f+k_b)z})e^{jk_xx}dk_x \quad (2)$$

Here, the wave number equation is separated into two quantities: $K_z=k_f+k_b$, where $k_f$ describes propagation from array 102 to target 118 (forward), and $k_b$ describes propagation from target 118 back to array 102 (backward). The latter is similar to a one-way SAR back propagation, so $k_b=\sqrt{k^2-k_x^2}$. Because the electric field 117 propagated from array 102 to target 118 is a pseudo plane-wave, it is described as $k_f=k$. In this modification, the wave is approximated as an ideal plane-wave. It is to be understood that this approximation puts some limitations on the capabilities of imaging system 100 and a better approximation for the forward propagated wave can be determined through an optimization routine. With a better equation for $k_f$, the limitations on image reconstruction are effectively removed.

Figure 2:
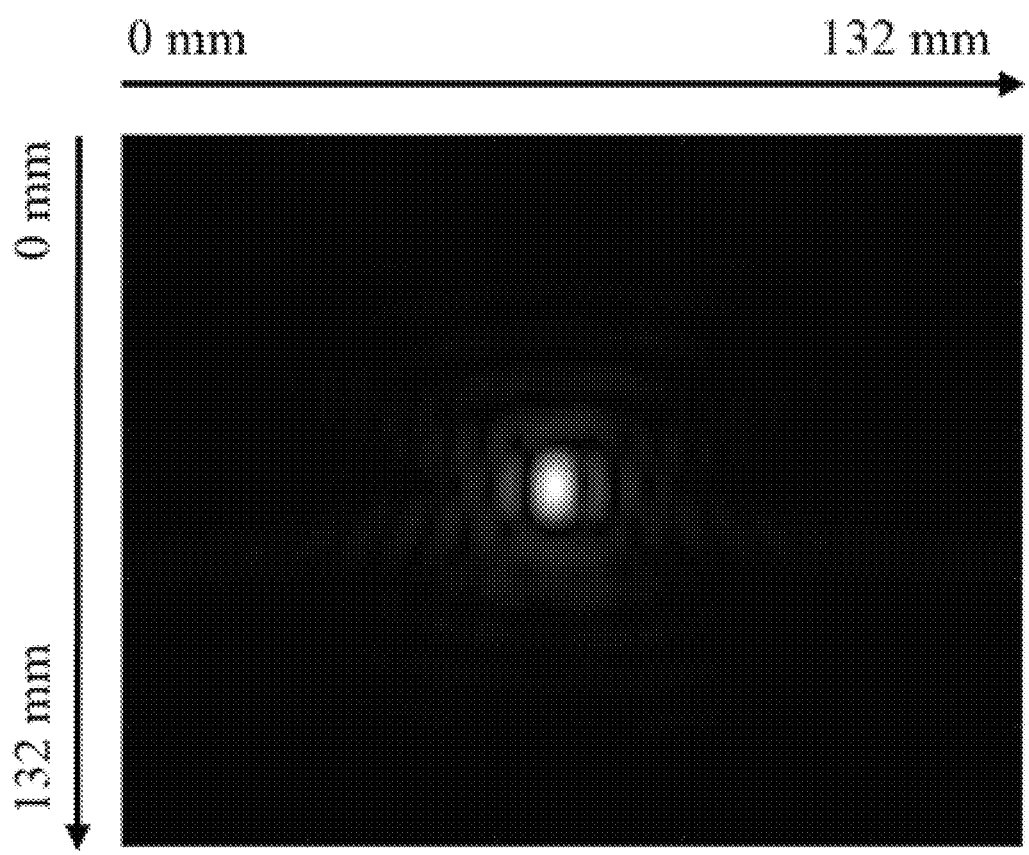
FIG. 2 is an exemplary image of an ideal point target generated by the imaging system of FIG. 1.

In an example, the imaging system 100 shown in FIG. 1 was used for the simulation model with an operating frequency range of 20-30 GHz. An ideal point target 118 was placed in the middle of array 102, and image processor 110 generated an image by the algorithm as shown in FIG. 2. The imaging system antenna array 102 is located at the top edge of the image. From the image, it is shown that the modified SAR algorithm embodying aspects of the present invention is capable of generating high-resolution images. Preferably, the plane-wave approximation is used within certain distances from imaging system 100 to maintain the uniform excitation of each antenna 116 in array 102 and the resulting antenna array effects.

According to embodiments of the invention, the antenna array 102 generates a pseudo plane-wave at various distances. An ideal plane-wave has equal amplitude and phase across array 102 for all distances. However, it is to be understood that as the distance from array 102 increases, the amplitude of the electric field 117 becomes less like a plane-wave. Additionally, near the edge of array 102, the phase of electric field 117 differs greatly from the phase at the middle of array 102.

In an embodiment, system 100 includes a printed circuit board on which array 102 is formed of 16 tapered slot-line antennas 116 at an edge of the board. Also at the edge of the board is an array of detectors 120, namely, 32 Schottky diodes for measuring the reflected electric fields 119. The inputs to the antennas 116 are connected to the divider network 112, which includes 1:16 passive Wilkinson dividers.

Figure 3:
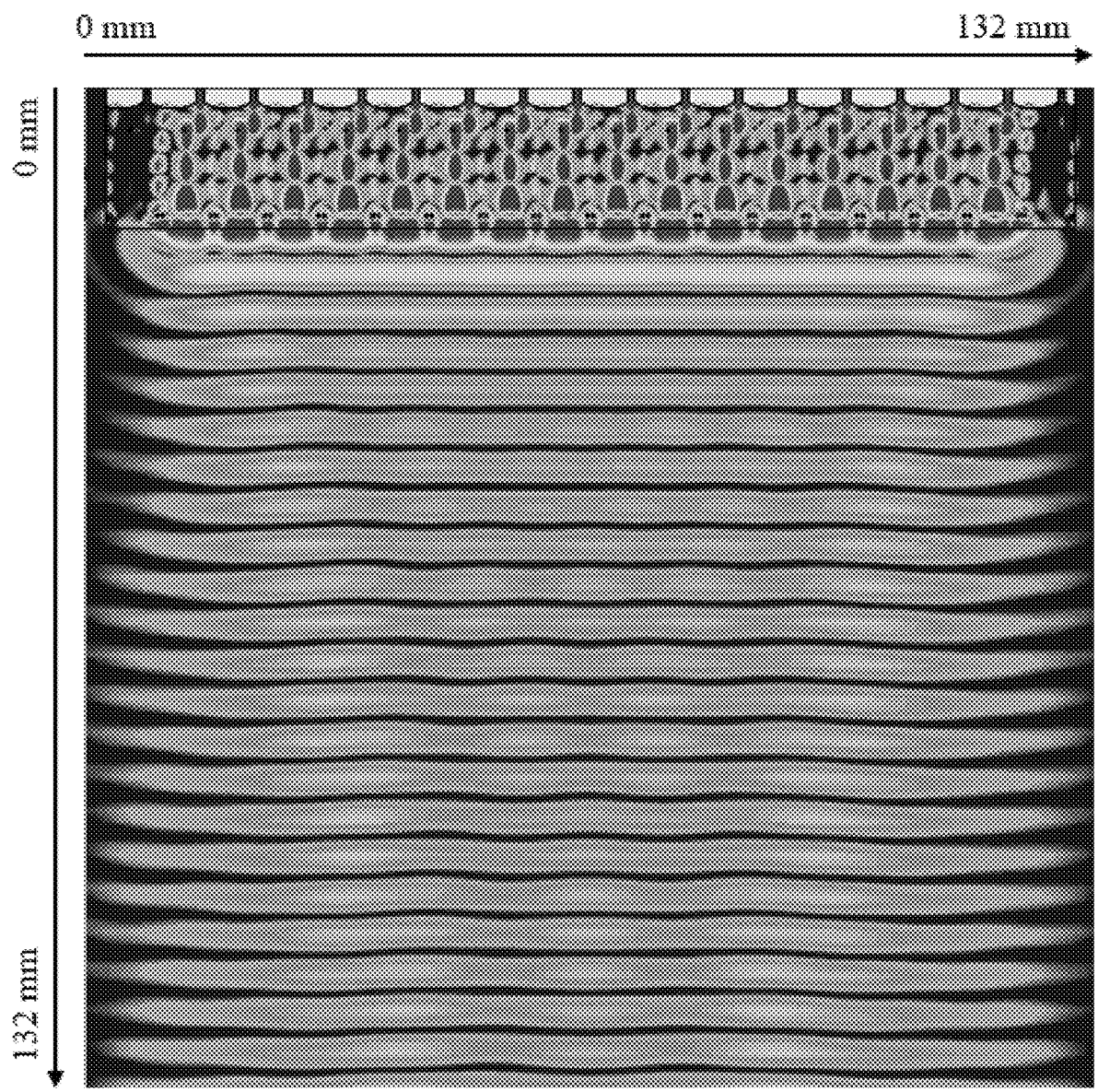
FIG. 3 illustrates an exemplary electric field radiated from antennas of the imaging system of FIG. 1.

FIG. 3 shows an electric field 117 radiating downward from array 102. Because array 102 in this embodiment is 132 mm wide, the electric field 117 is plotted for distances up to 132 mm away, which is a rule of thumb for the farthest distance from the aperture where desired image resolution is preserved for aperture-limited systems. Ideally, the electric field should look like horizontal lines parallel to the aperture of array 102. For the majority of the region below the exemplary array illustrated at the top of FIG. 3, this is the case. Variations in amplitude and phase in the electric field 117 are relatively minimal because the antennas 116 radiating the electric field 117 in FIG. 3 have a relatively narrow beamwidth. By comparison, an electric field distribution along x at various distances from the imaging system would exhibit greater variations when the antennas 116 are ideal point sources. From FIG. 3, it is shown that while there are limited regions for the plane-wave approximation, most of the region below array 102 can still be used for improved imaging in accordance with embodiments of the invention.

Figure 4:
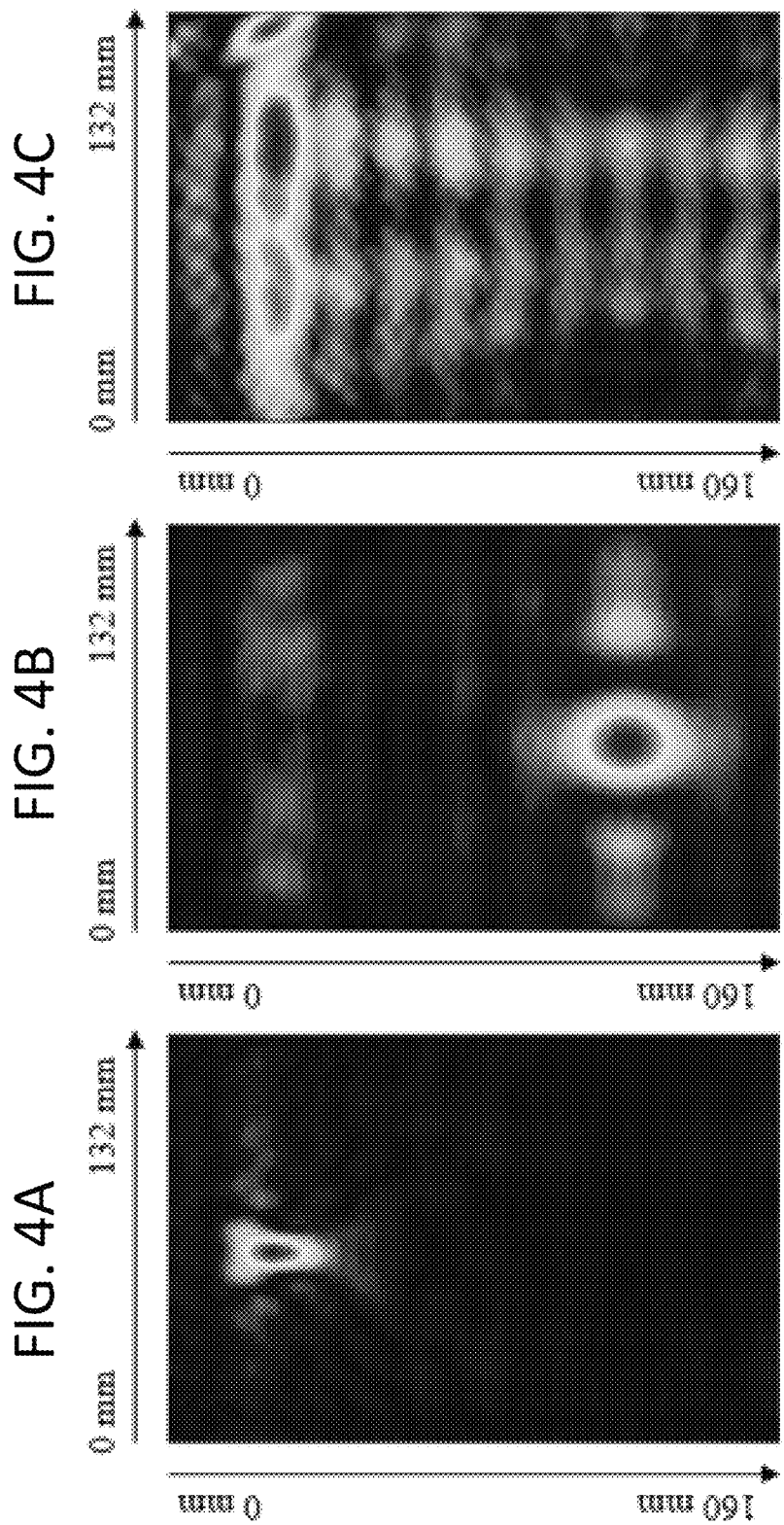
FIG. 4A is an image of a metal ball placed at the center, close to an antenna array of FIG. 1.
FIG. 4B is an image of a metal ball placed at center, far from an antenna array of FIG. 1.
FIG. 4C is an image of a metal ball placed at the edge of an antenna array of FIG. 1.

Referring now to FIGS. 4A, 4B, and 4C, target 118 is a metal ball in front of the aperture of antenna array 102 at different locations relative to antennas 116 and detectors 120. The image processor 110 generates images of the metal ball based on the voltages measured at detectors 120 (e.g., Schottky diodes). In FIG. 4A, the small metal ball in clearly visible and with an indication matching the small physical size of the ball. In FIG. 4B, the metal ball is placed relatively far away but still at the center of array 102. The ball is clearly visible, but larger due to the expected degraded resolution, which is a property of the ω-k algorithm. And in FIG. 4C, the ball placed at the right edge of array 102 is not clearly visible. This is due to the electric field phase distortions at the edge of array 102 as described above. The images of FIGS. 4A, 4B, and 4C indicate that the system 100 of FIG. 1 is capable of imaging to a predetermined distance away from and offset from array 102.

In an embodiment, a printed circuit board houses 16 antennas 116 with 32 Schottky diodes (detectors 120) at the aperture of array 102. A signal transmitted into the board is first amplified by an HMC499LC4 RF amplifier, which is to compensate for signal loss between the amplifier and antennas 116. The output of the amplifier is then re-routed to each antenna 116 via a series of passive dividers 112. The controller hardware preferably tunes microwave source 104 to 21.5-27 GHz frequency range (full range of the source).

Figure 5:
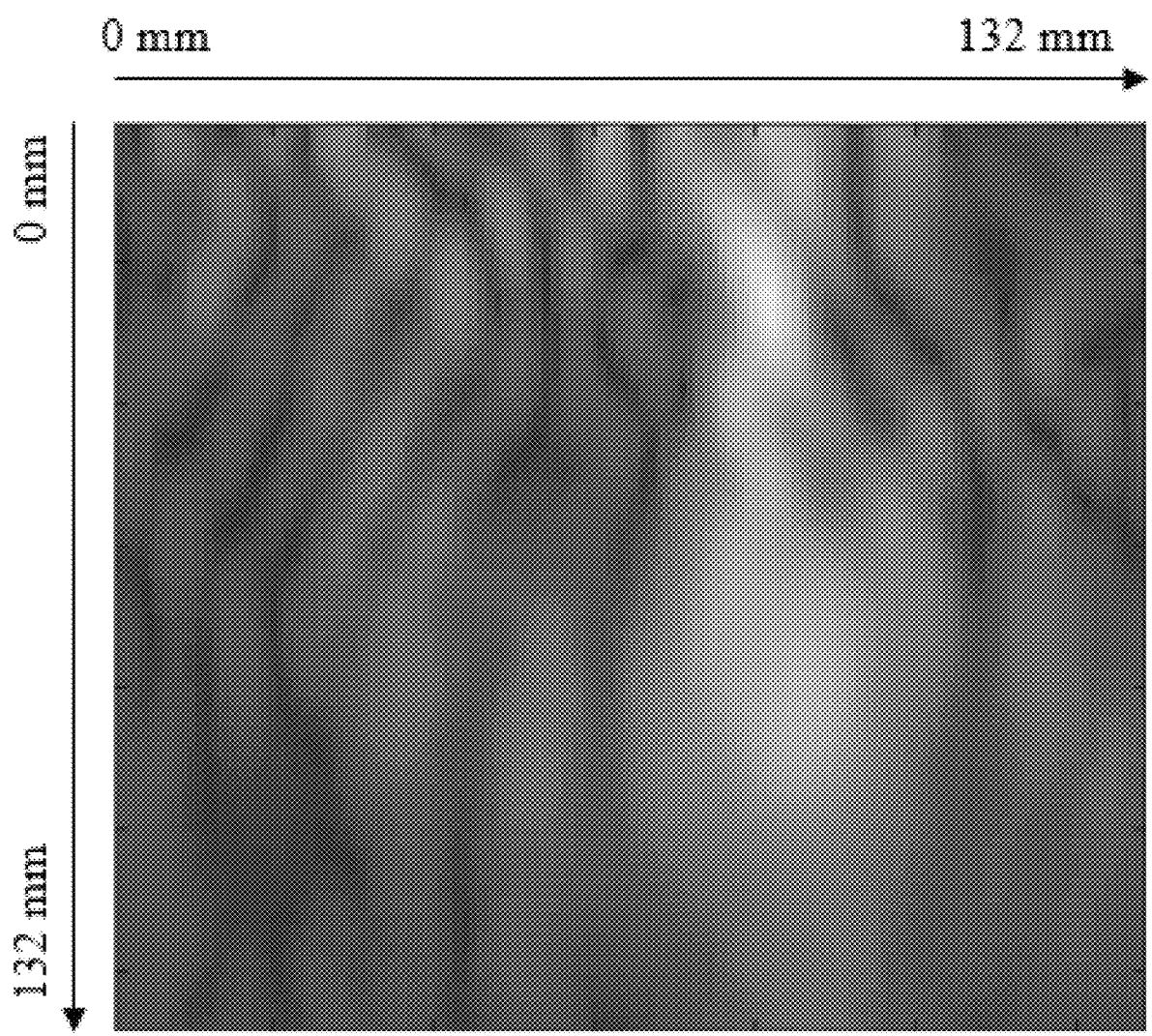
FIG. 5 is a cross sectional image of a metal rod imaged by the imaging system of FIG. 1.

FIG. 5 is an exemplary image of a metal rod generated via the fabricated antenna array 102 described above. In this instance, the rod is oriented normal to the plane of antenna array 102 and, thus, is represented in the figure as a generally circular shape. The image of FIG. 5 shows the circle clearly with some localized distortions. Additionally, the surrounding noise in the image is higher than in the simulations. This is usually caused by noise sources in the physical hardware not considered in simulation and amplitude imbalance between the 32 diodes. Amplitude imbalance between the diodes can be removed by proper amplitude calibration.

Overall, the system 100 of FIG. 1 has been shown to be capable of generating images of targets with some appreciable fidelity without the requirement of a microwave multiplexer network.

Figure 6:
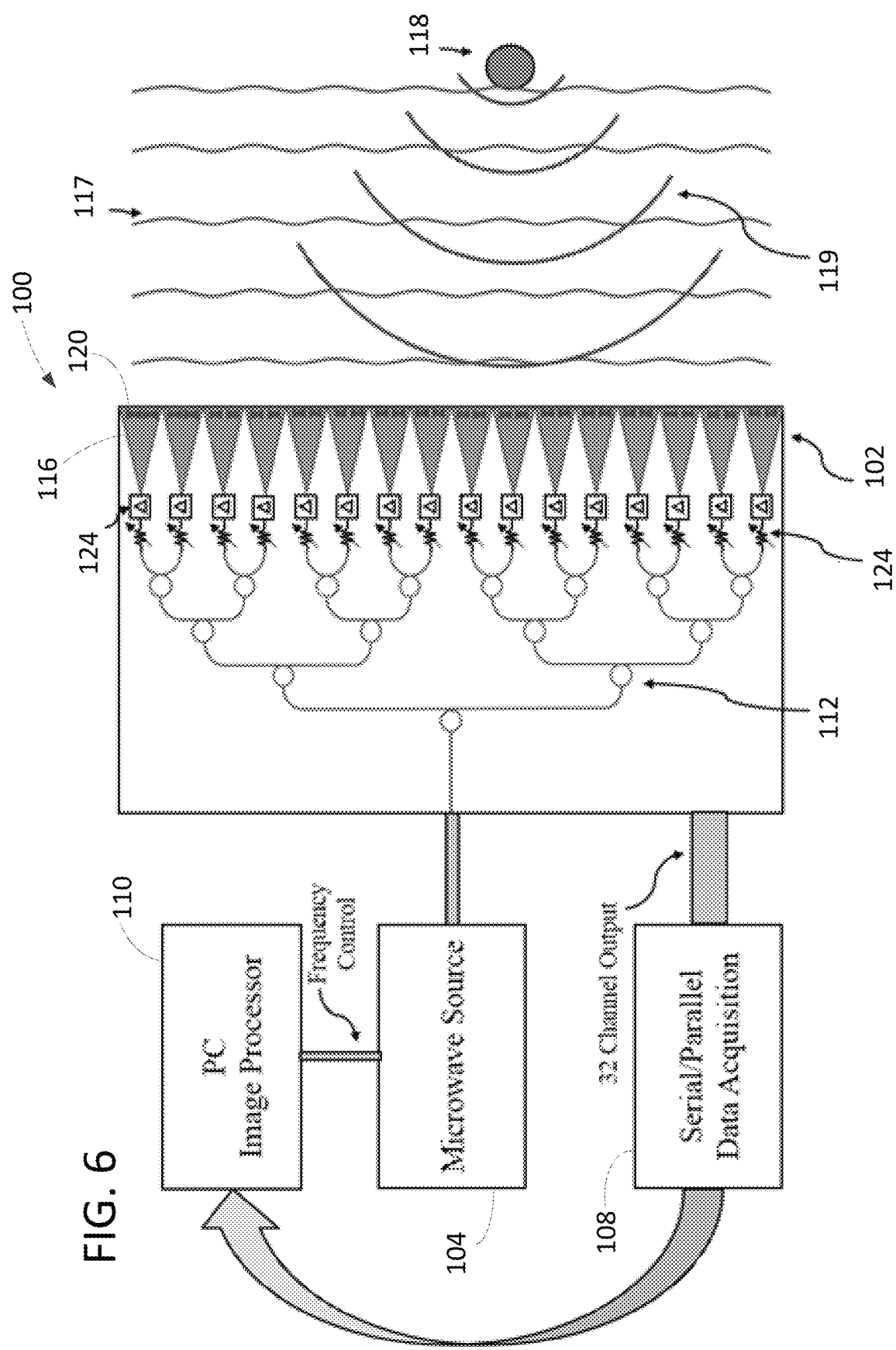
FIG. 6 is a schematic diagram of an imaging system with amplitude and phase shifting elements in accordance with an alternative embodiment of the invention.

It is contemplated to make use of antenna array design principles to enhance the electric field 117 radiated from the array 102 and to expand the functionality of system 100. FIG. 6 illustrates an alternative embodiment in which system 100 comprises microwave signal amplitude and phase shifting elements 124 (e.g., attenuators, phase shifters, etc.) placed between the antenna elements 116 and the passive divider network 112. The additional elements 124 permits synthesizing a more accurate plane-wave at many distances from array 102 by properly choosing the proper values for the amplitude and phase shifting elements 124. By synthesizing a more accurate plane-wave pattern, the approximation of the forward propagated electric field becomes the actual representation in the modified ω-k algorithm. Thus, image distortions are effectively removed.

Another use of amplitude and phase shifting elements 124 is beam steering the array 102 in its far field. In one instance, the phase shifter elements 124 are set to create a plane-wave in the near-field of the array, and in another instance, they are set to create a progressive phase distribution for beam scanning wide angles in the far-field. This creates a dual purpose imaging system for imaging both in the near-field and far-field of the array.

Figure 7:
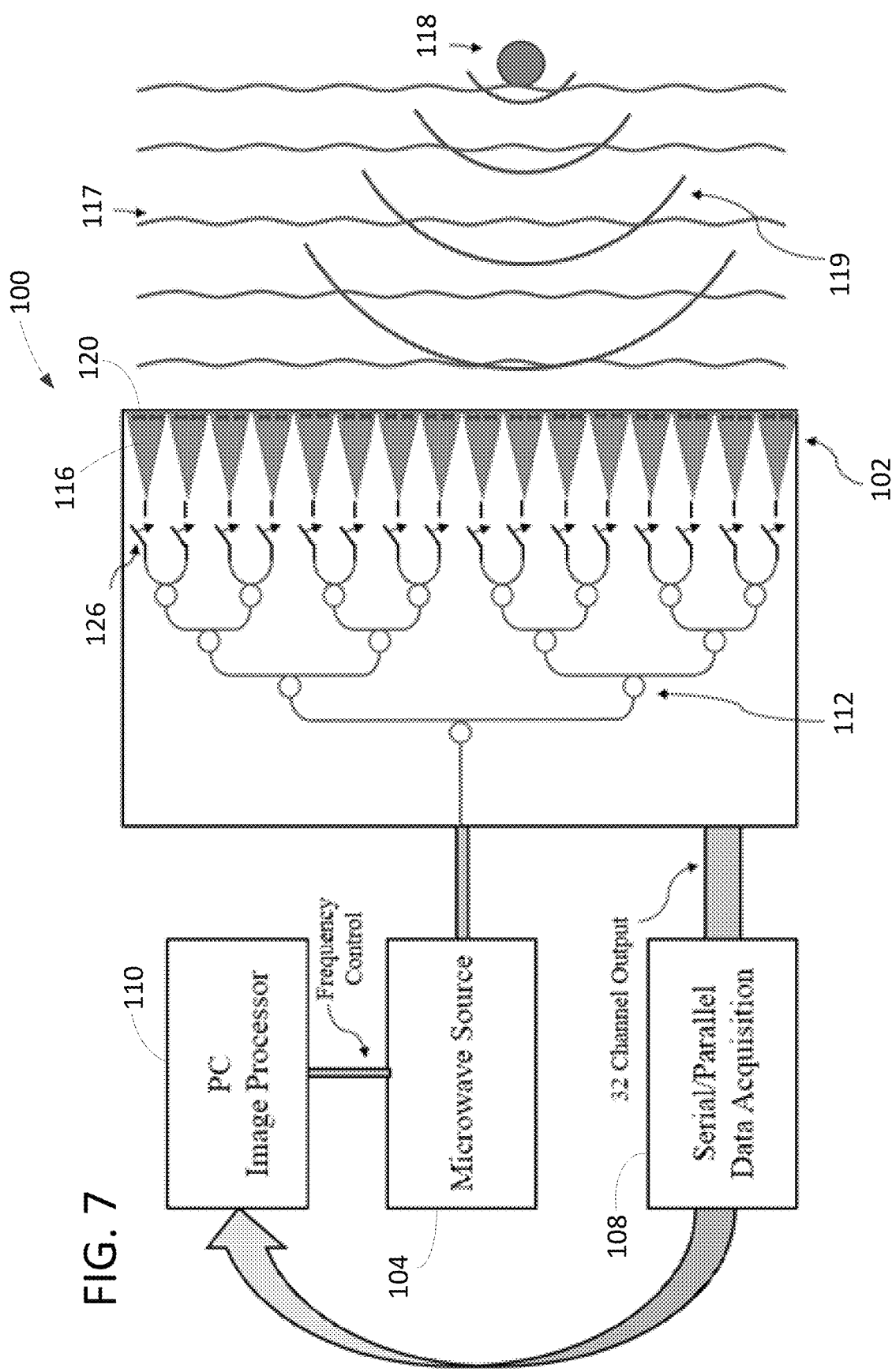
FIG. 7 is a schematic diagram of an imaging system with single pole single throw switches in accordance with an alternative embodiment of the invention.

Yet another alternative embodiment of an imaging system 100 is shown in FIG. 7, where single pole single throw switches 126 are placed between passive divider network 112 and antenna elements 116, instead of amplitude and phase shifting elements 124. The use of the switches 126 permits selectively turning on certain antenna elements 116 (i.e., randomly turn on certain antenna elements 116, turn on every other antenna element 116, etc.), so the total scanning range can be extended and/or imaging resolution improved. This is an additional method for imaging close to and far from array 102 with the same system 100.

Figure 8:
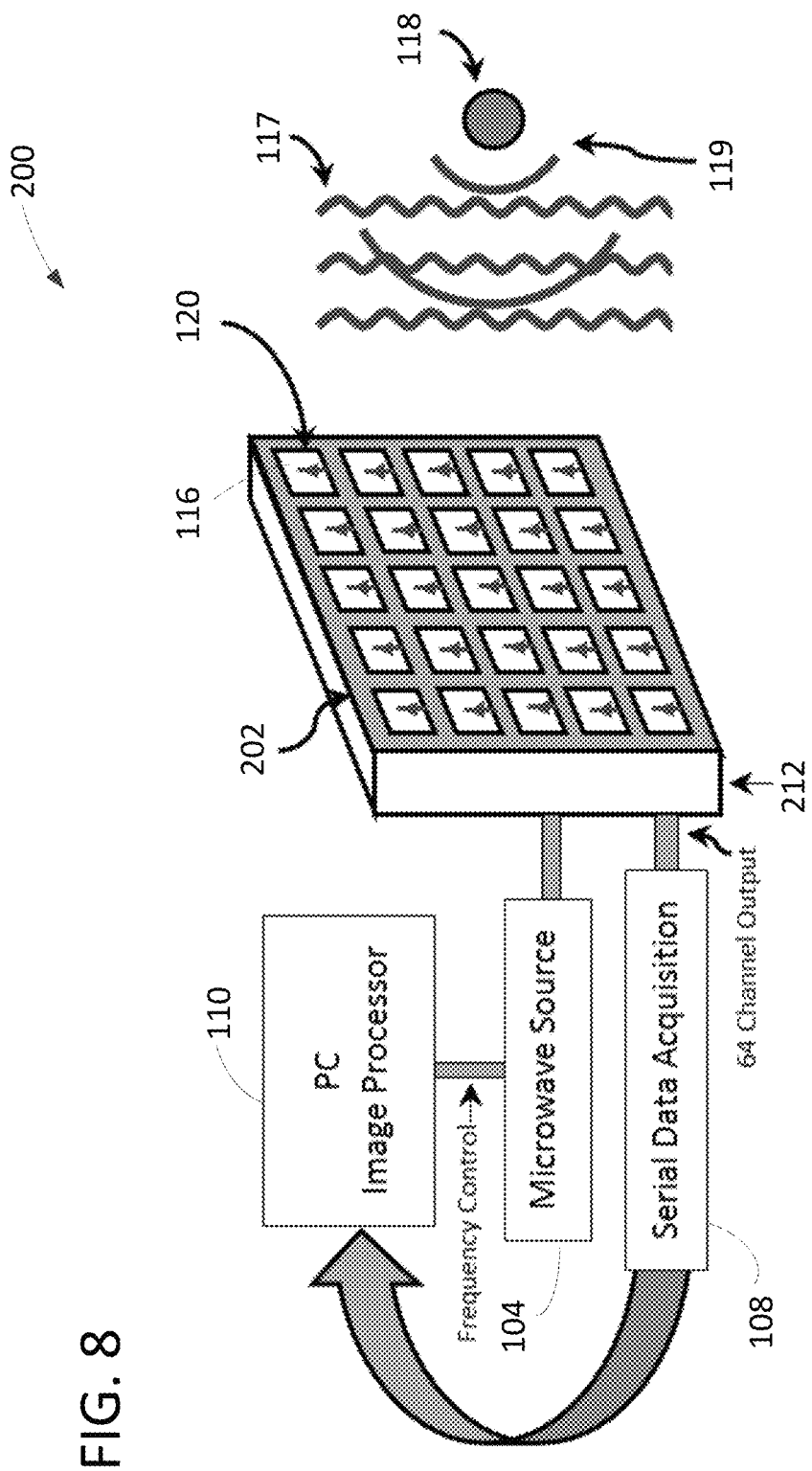
FIG. 8 is a schematic diagram of an imaging system with 2-dimensional antenna array in accordance with an alternative embodiment of the invention.

In yet another embodiment, a system 200 embodying aspects of the invention is capable of 2D imaging and employs a planar antenna array 202. A schematic of the imaging system 200 is shown in FIG. 8. The imaging system 200 contains the same major components as the linear array imaging system 100 described above. In this instance, however, system 200 employs a corporate feed waveguide structure 212 rather than passive power divider network 112. The corporate feed waveguide structure 212 has much lower signal loss than the Wilkinson divider-based feed. Also, the array 102 has a plurality (e.g., 64) of rectangular slots 216 loaded with Schottky power detectors 220 instead of the linear array 102 of tapered slot-line antennas 116, thus allowing for 2D microwave imaging. In the present embodiment, the design operates in the 23-25 GHz frequency range, and the slot antennas 216 are loaded with power detectors 220. In an embodiment, the system 200 is approximately 3.6"×5.0"×2.2" in size.

Figure 9:
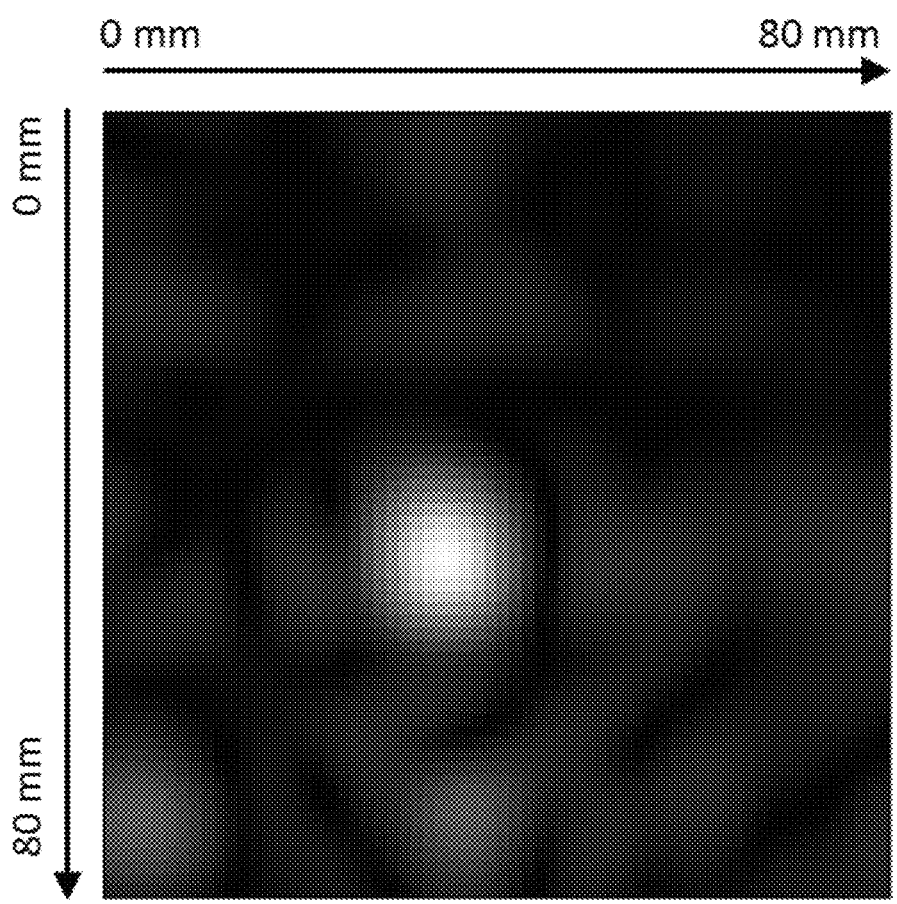
FIG. 9 is an image of three metal balls placed at different locations relative to the imaging system of FIG. 8.

As described above, imaging system 200 generates a pseudo plane-wave in front of the imaging array 102 but the region where a pseudo plane-wave exists becomes smaller as the distance from the imaging array 102 increases. To test system 200, three small metal spheres are placed 40 mm, for example, in front of array 202. The system 200 in this example is oriented with the antenna array 202 radiating up into the air. Then, a 40 mm-thick piece of construction foam is placed on top of the aperture of antenna array 202. One metal sphere is placed in the middle of the foam where a pseudo plane-wave exists, the next metal sphere is placed at an edge of the pseudo plane-wave region, and the third metal sphere wave is placed outside the pseudo plane-wave region. The resulting image in FIG. 9 shows a clear indication of the center metal sphere, and the second sphere is darker but still visible at the lower left corner of the image. Finally, the sphere outside the pseudo plane-wave region cannot be seen, as expected. This illustrates the effect of imaging targets 118 inside and outside the region where a pseudo plane-wave exists.

Figure 10:
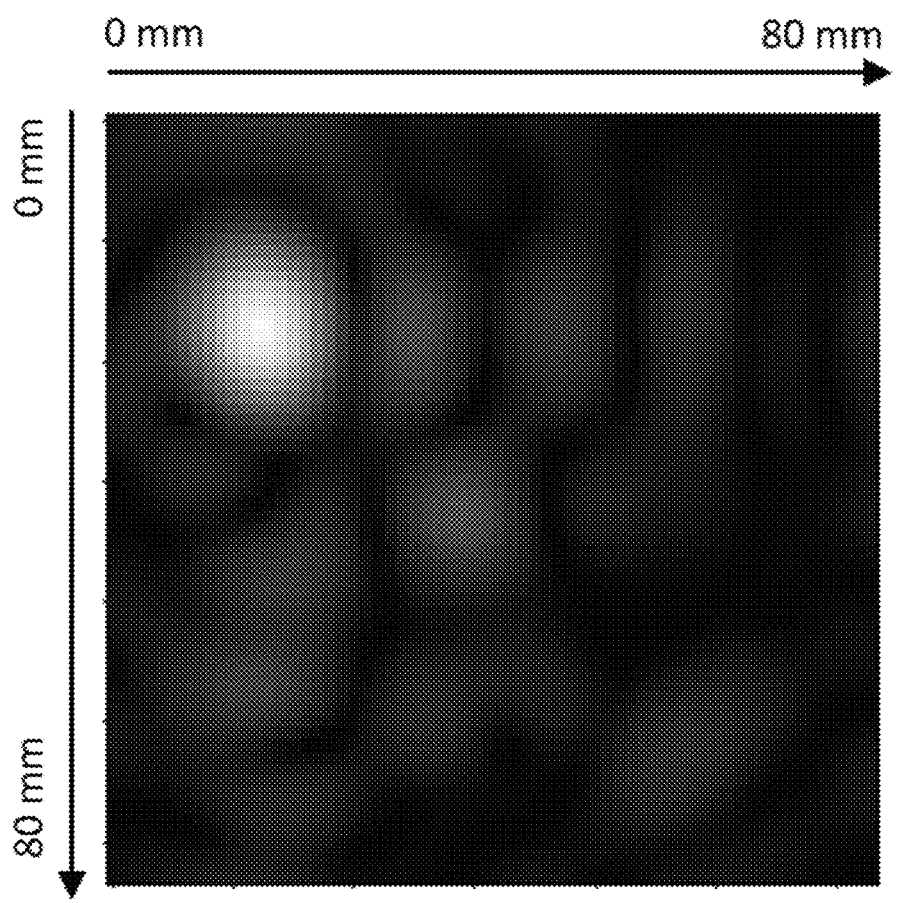
FIG. 10 is an image of three spheres having different dielectric properties placed at different locations relative to the imaging system of FIG. 8.

Another test determines the sensitivity of imaging system 200 to targets 118 that have different dielectric properties (i.e., level of reflected signal from target 118). The target 118 will scatter stronger or weaker signals depending on its dielectric properties. In this test, a metal sphere (strong scatterer) is placed in the upper left corner of imaging array 202; a rubber target (moderate scatterer) placed in the center of imaging array 202; and a plastic sphere (weak scatterer) is placed in the lower right corner of imaging array 202. The resulting image in FIG. 10 shows a bright indication of the metal sphere. In an embodiment, there may be additional distortions directly right and below the indication of the metal sphere due to aliasing and the strong scattering from the metal sphere. The indication of the rubber target is darker but visible in the center of the image of FIG. 10, and the indication of the plastic sphere is barely visible in the lower right corner of the image. This image shows how different materials appear brighter or darker depending on their dielectric properties, as expected.

Figure 11:
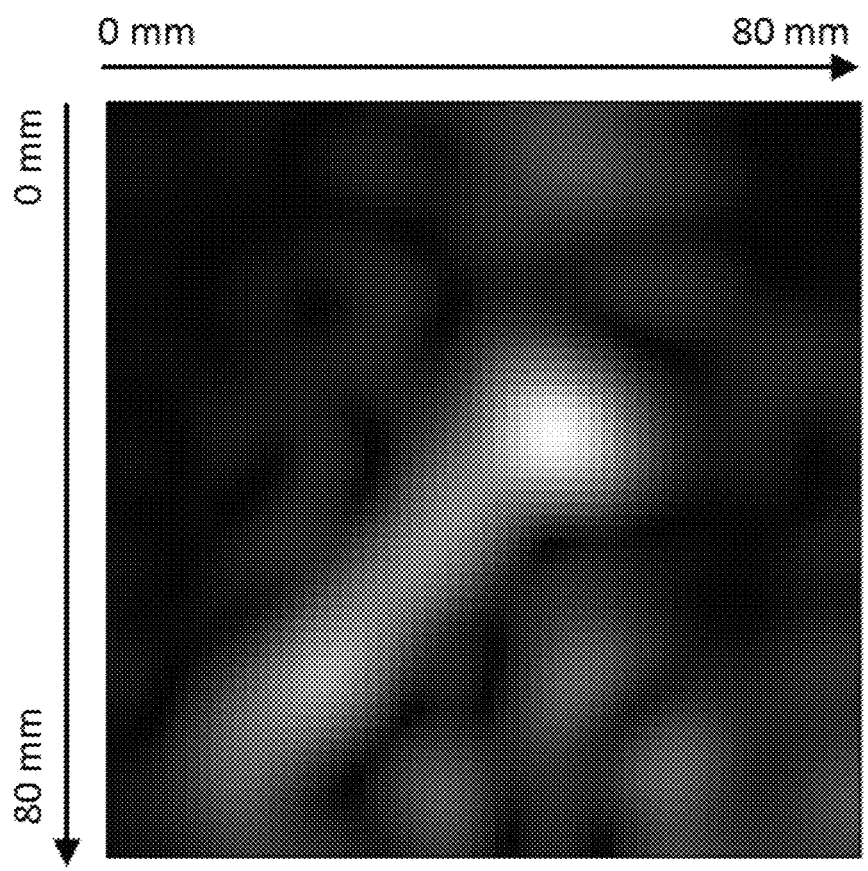
FIG. 11 is an image of a key placed in front of the imaging system of FIG. 8.

The image of FIG. 11 demonstrates ability of system 200 to detect relatively large metallic objects, which is crucial for security applications. FIG. 11 shows the resulting image of placing a metal key in front of imaging system 200. In the microwave image, the basic shape and size of the key can be observed. It is contemplated to employ this imaging methodology for detecting large metallic objects for various security applications.

In addition to the embodiments described above, embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer and comprises computer storage media and communication media. By way of example, and not limitation, computer storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired non-transitory information in the form of computer-executable instructions or data structures and that can be accessed by a computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory computer storage media, including nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An imaging system comprising:
a signal source having a transmission line coupled thereto;
an antenna array in communication with the signal source via the transmission line, the antenna array comprising a plurality of antennas by which a signal generated by the signal source is transmitted incident to an object located remotely from the antenna array within a target region located in front of the antenna array and by which a signal reflected from the object is received by the antenna array, the antennas each defining an aperture, and the signals transmitted by the antennas being substantially equal in magnitude and phase at each of the antennas and collectively having an effective electric field resembling a plane-wave within the target region;
a plurality of detectors each connected to one of the antennas and configured to simultaneously receive the reflected signal and to provide an output signal representative thereof;
an image processor configured to execute an imaging algorithm for generating a multi-dimensional profile representative of the object based on the output signals from the detectors; and
a standing wave probe located at a distance from each of the apertures, the distance of the standing wave probe from the respective aperture being a fraction of a wavelength of the signal generated by the signal source such that the standing wave probe is phase-referenced to the aperture for sampling the reflected signal.

2. The system of claim 1, further comprising a divider network coupled between the signal source and the antenna array, said divider network receiving the signal generated by the signal source via the transmission line and distributing the signal generated by the signal source to each of the antennas.

3. The imaging system of claim 2, wherein the divider network comprises a passive Wilkinson divider network.

4. The imaging system of claim 2, wherein the divider network comprises a passive corporate waveguide divider.

5. The system of claim 1, wherein the imaging algorithm is based on a ω-k SAR algorithm.

6. The imaging system of claim 1, wherein the standing wave probes are each located adjacent to the respective aperture.

7. The imaging system of claim 1, wherein the standing wave probes feed the signal received thereby to the detectors.

8. The imaging system of claim 1, wherein the detectors each comprise at least one Schottky diode.

9. The imaging system of claim 1, wherein the signal generated by the signal source is at a microwave frequency.

10. The imaging system of claim 1, wherein the signal generated by the signal source is at a millimeter wave frequency.

11. The imaging system of claim 1, wherein the antenna array comprises a linear array.

12. The imaging system of claim 1, wherein the antenna array comprises a two dimensional array.

13. A method of imaging a remote object using an antenna array, the method comprising:
transmitting a signal from a source via an antenna array and incident to the object, the signal source configured to provide an electromagnetic energy source ranging in frequencies up to and including a terahertz frequency range, the antenna array comprising a plurality of antennas by which the signal from the signal source is transmitted incident to the object within a target region located in front of the antenna array and by which a signal reflected from the object is received by the antenna array, the antennas each defining an aperture, the signals transmitted by the antennas being substantially equal in magnitude and phase at each of the antennas and collectively having an effective electric field resembling a plane-wave within the target region, wherein a standing wave probe is positioned at a distance from each of the apertures, and wherein the distance of the standing wave probe from the respective aperture is a fraction of a wavelength of the signal generated by the signal source such that the standing wave probe is phase-referenced to the aperture for sampling the reflected signal;

simultaneously receiving, by a plurality of detectors each connected to one of the antennas, the signal reflected from the object and providing an output signal representative thereof;

feeding the signal received by the standing wave probe to a corresponding one of the detectors; and generating, by a processor executing an imaging algorithm, a multi-dimensional profile representative of the object based on the output signals from the detectors.

14. The method of claim 13, further comprising distributing, by a divider network coupled between the signal source and the antenna array, the signal generated by the signal source to each of the antennas, said divider network receiving the signal generated by the signal source via the transmission line.

15. The method of claim 14, wherein the divider network comprises at least one of a passive Wilkinson divider network and a passive corporate waveguide divider.

16. The method of claim 13, wherein the imaging algorithm is based on a $\omega$-k SAR algorithm.

* * * * *